(12) United States Patent
McCallum et al.

(10) Patent No.: US 11,438,150 B2
(45) Date of Patent: Sep. 6, 2022

(54) CONSTRAINED KEY DERIVATION IN LINEAR SPACE

(71) Applicant: Red Hat, Inc., Raleigh, NC (US)

(72) Inventors: Nathaniel P. McCallum, Cary, NC (US); Peter M. Jones, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 237 days.

(21) Appl. No.: 16/269,911

(22) Filed: Feb. 7, 2019

(65) Prior Publication Data
US 2020/0259641 A1 Aug. 13, 2020

(51) Int. Cl.
| | | |
|---|---|---|
| H04L 29/06 | (2006.01) | |
| H04L 9/08 | (2006.01) | |
| G06F 21/62 | (2013.01) | |
| G06F 17/11 | (2006.01) | |

(52) U.S. Cl.
CPC ............ H04L 9/0861 (2013.01); G06F 17/11 (2013.01); G06F 21/62 (2013.01)

(58) Field of Classification Search
CPC .............................................. G06F 2221/2111
See application file for complete search history.

(56) References Cited

U.S. PATENT DOCUMENTS

| | | | |
|---|---|---|---|
| 5,640,452 | A | 6/1997 | Murphy |
| 6,978,376 | B2 | 12/2005 | Giroux et al. |
| 7,092,943 | B2 | 8/2006 | Roese et al. |
| 7,266,684 | B2 | 9/2007 | Jancula |
| 7,508,788 | B2 | 3/2009 | Anjum |
| 8,320,562 | B2 | 11/2012 | Hammond et al. |
| 9,026,787 | B2 | 5/2015 | Kufluk |
| 9,053,329 | B2 | 6/2015 | Lam |
| 9,215,236 | B2 | 12/2015 | Kennedy |
| 9,729,318 | B2 | 8/2017 | Hoy et al. |
| 9,805,214 | B2 | 10/2017 | Sahu et al. |
| 9,818,315 | B2 | 11/2017 | Hiltunen et al. |
| 9,819,488 | B2 | 11/2017 | Gungor et al. |
| 9,923,719 | B2 | 3/2018 | Marson |
| 9,940,477 | B2 | 4/2018 | Sibillo |
| 9,967,097 | B2 | 5/2018 | Sivaramamurthy et al. |
| 10,152,604 | B1 | 12/2018 | Diaz et al. |

(Continued)

OTHER PUBLICATIONS

Atallah, Mikhail J., et al, "Incorporating Temporal Capabilities in Existing Key Management Schemes", 2007, https://pdfs.semanticscholar.org/5c03/1ee99d0e1f2c8cd6799912da377ed591cb36.pdf, 16 pages.

(Continued)

*Primary Examiner* — Jason K Gee
(74) *Attorney, Agent, or Firm* — Lowenstein Sandler LLP

(57) ABSTRACT

The technology disclosed herein provides an enhanced cryptographic access control mechanism that uses a cryptographic keys that are based on proximity data. An example method may include: determining proximity data of a computing device; transforming the proximity data in view of conversion data associated with the computing device, wherein the conversion data causes a set of alternate proximity data values to transform to a specific cryptographic value; creating, by a processing device, a cryptographic key in view of the transformed proximity data; and using the cryptographic key to enable access to a protected resource.

20 Claims, 5 Drawing Sheets

(56) References Cited

U.S. PATENT DOCUMENTS

| | | | |
|---|---|---|---|
| 10,778,413 B2 | 9/2020 | Chalker | |
| 11,184,350 B2 | 11/2021 | Mainali | |
| 11,190,352 B2 | 11/2021 | Thaler | |
| 2002/0051540 A1* | 5/2002 | Glick | H04L 63/1408 380/258 |
| 2002/0136407 A1* | 9/2002 | Denning | G06F 21/10 380/258 |
| 2005/0071657 A1 | 3/2005 | Ryan | |
| 2007/0086593 A1 | 4/2007 | Denning et al. | |
| 2007/0101438 A1 | 5/2007 | Govindarajan | |
| 2009/0052663 A1* | 2/2009 | Hammond | H04L 9/0838 380/44 |
| 2009/0316900 A1 | 12/2009 | Qiu et al. | |
| 2009/0319769 A1 | 12/2009 | Betouin et al. | |
| 2010/0257351 A1 | 10/2010 | O'Connor et al. | |
| 2012/0243687 A1* | 9/2012 | Li | H04L 9/085 380/277 |
| 2013/0290696 A1 | 10/2013 | Broustis | |
| 2014/0022920 A1 | 1/2014 | Dua et al. | |
| 2014/0164761 A1* | 6/2014 | Kufluk | H04W 12/06 713/155 |
| 2015/0271155 A1* | 9/2015 | Ronca | H04L 63/0492 713/168 |
| 2015/0349954 A1 | 12/2015 | Borda | |
| 2016/0013941 A1 | 1/2016 | Gungor et al. | |
| 2016/0043866 A1 | 2/2016 | Nixon et al. | |
| 2016/0171238 A1 | 6/2016 | Sibillo | |
| 2016/0197729 A1 | 7/2016 | Jones | |
| 2017/0070484 A1 | 3/2017 | Kruse et al. | |
| 2017/0070485 A1 | 3/2017 | Kumar et al. | |
| 2017/0126698 A1 | 5/2017 | Minkovich et al. | |
| 2017/0132533 A1 | 5/2017 | Darnell et al. | |
| 2017/0134369 A1 | 5/2017 | Bilal et al. | |
| 2017/0237556 A9 | 8/2017 | Denning et al. | |
| 2017/0264608 A1 | 9/2017 | Moore et al. | |
| 2017/0372085 A1 | 12/2017 | Howe et al. | |
| 2018/0069846 A1 | 3/2018 | Park et al. | |
| 2018/0219840 A1 | 8/2018 | Quaglia et al. | |
| 2019/0130136 A1 | 5/2019 | Claypool et al. | |
| 2019/0164156 A1 | 5/2019 | Lindemann | |
| 2020/0169400 A1 | 5/2020 | Thaler et al. | |
| 2020/0235911 A1 | 7/2020 | Safak et al. | |

OTHER PUBLICATIONS

Cui, Yihui et al, "A Time-Based Group Key Management Algorithm Based on Proxy Re-encryption for Cloud Storage", 2014, Wuhan University, China, https://link.springer.com/chapter/10.1007/978-3-319-11116-2_11, 4 pages.

Badawya, Ahmed et al, "Unleashing the Secure Potential of the Wireless Physical Layer: Secret Key Generation Methods", Jun. 2016, Politecnico di Torino, DET, Italy, 10 pages.

Beretino, Elisa et al., "Location-Based Access Control Systems for Mobile Users—Concepts and Research Directions", Nov. 2011, Purdue University, 5 pages.

Gholap, Nisha et al., "Location and Authentication Based Encryption Scheme Application Design For Mobile Device", Apr. 2013, vol. 2 Issue 4, International Journal of Engineering Research & Technology, 5 pages.

Liao, Hsien-Chou et al., "A New Data Encryption Algorithm Based on the Location of Mobile Users", Information Technology Journal, 7: 63-69, 15 pages.

Naidu, P. Sanyasi, "Investigation and Analysis of Location based Authentication and Security Services of Wireless LAN's and Mobile Devices", Jul. 2016, vol. 146, No. 8, International Journal of Computer Applications, 6 pages.

\* cited by examiner

CONSTRAINED KEY DERIVATION IN LINEAR SPACE

TECHNICAL FIELD

The present disclosure is generally related to cryptographic systems, and is more specifically related to a cryptographic access control mechanism that uses cryptographic keys that are based on proximity data of a device at a time before, during, or after attempting to access a protected resource.

BACKGROUND

Modern computers often use cryptographic techniques to restrict access to content. The cryptographic techniques may involve generating a secret key that is used by a device to access the content. The secret key may be something as simple as a passcode or something more complex, such as a cryptographic token. The device may use the secret key as input to a locking mechanism to gain access to the content. The locking mechanism may involve a cryptographic function and the device may use the secret key as input when executing the cryptographic function. If the secret key is correct, the cryptographic function will enable access to the content and if the secret key is incorrect, the cryptographic function will not enable access to the content. In a simple example, the secret key may be used with the cryptographic function to encrypt content and may be subsequently used to decrypt the content in order to enable a device to access the content.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
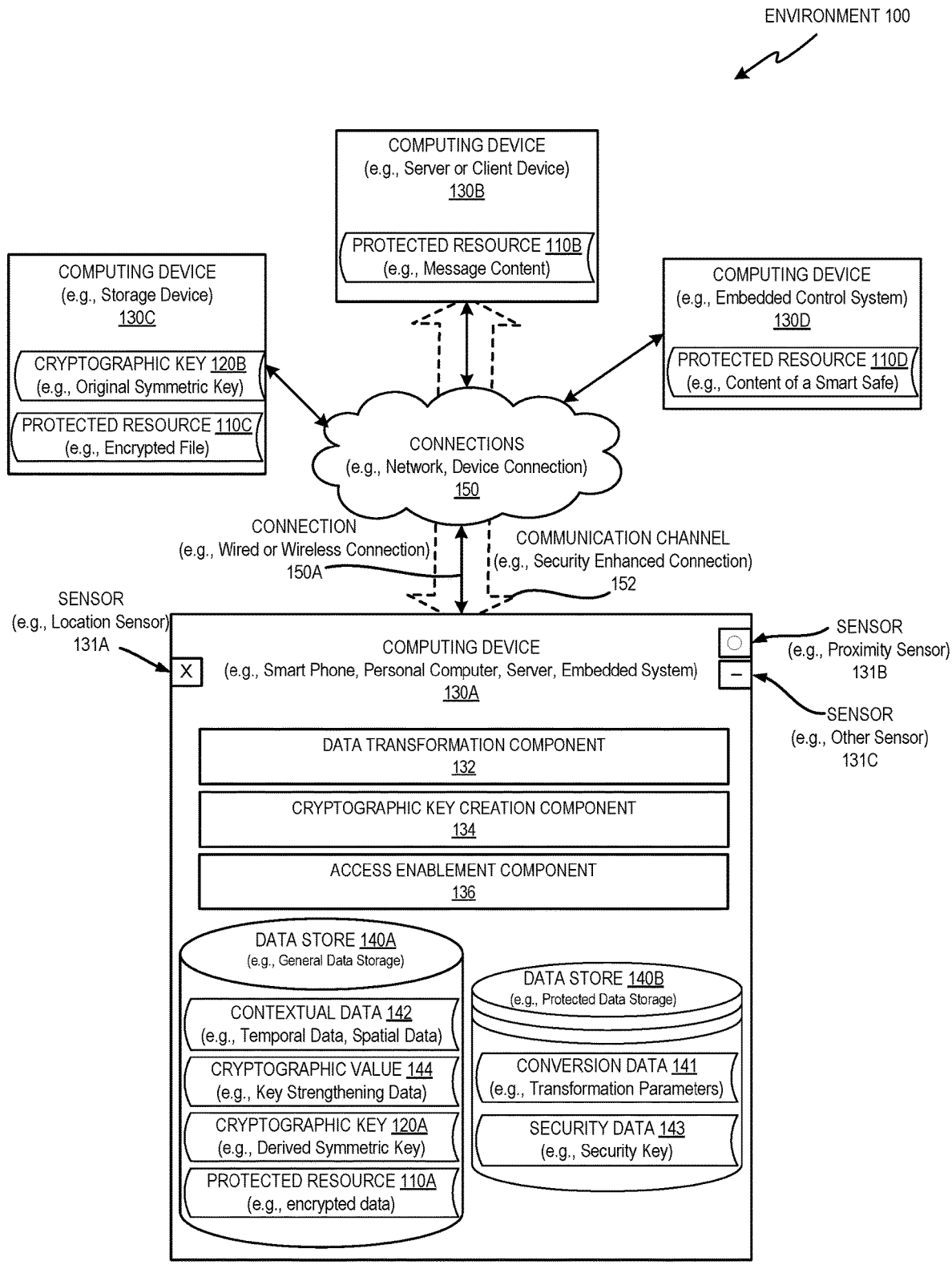
FIG. 1 depicts a high-level block diagram of an example environment, in accordance with one or more aspects of the present disclosure.

Modern computer systems restrict access to content using cryptographic techniques and enable access to the content by providing devices with a key. The access is traditionally provided at a binary level and the device has access to the content if the device has the key and is prohibited access if the device does not have the key. The binary level of traditional cryptographic techniques is equivalent to a unidimensional access mechanism that is based on whether the device attempting to access the content is in possession of the key. Restricting access based on possession alone is often insufficient for a more sophisticated access control mechanism.

Systems have attempted to enhance the criteria used to access content by providing an access control layer on top of the cryptographic techniques. The access control layer may include executable rules that check additional criteria and control whether the device is or is not able to use the cryptographic key. The executable rules can be circumvented or compromised and rarely provide the same level of security that the underlying cryptographic techniques provide. For example, the rules may execute on the same device that is attempting to access the content and the device may be compromised in a manner that enables the device to bypass the access control layer to access the cryptographic key directly and therefore enables the device to access the content.

Aspects of the present disclosure address the above and other deficiencies by providing enhanced cryptographic access control technology. The technology may control access to a protected resource based on time, location, key possession, other criteria, or a combination thereof. The access control criteria may be integrated within the cryptographic technique (e.g., cryptographic key derived from contextual data) as opposed to executable rules layered above the cryptographic technique. In one example, the cryptographic access control technology disclosed herein may involve determining proximity data of a computing device. The proximity data may correspond to a distance between the computing device and another device (e.g., beacon, access point, cell tower). In one example, the proximity data may indicate a distance value or data used to calculate the distance value, such as a communication latency, processing delay, or a combination thereof. The computing device may transform the proximity data into one or more cryptographic values based on conversion data associated with the computing device. The conversion data may be provided by a trusted source and may be formed in view of access criteria that determine the situations in which the computing device should have access to the protected resource. For example, the access criteria may indicate the protected resource can be accessed when the computing device is within a threshold distance (e.g., 20 ft) and the conversion data may include input for a mathematical function that is used to transform a distance value into one or more cryptographic values. The computing device may use the transformed proximity data to create a cryptographic key and the cryptographic key may be used to access a protected resource. If the proximity data was incorrect (e.g., not within threshold distance), then the resulting cryptographic key would fail to provide access to the protected resource. Access to the protected resource may involve decrypting a protected resource (e.g., decrypting a local file), establishing a communication channel (e.g., establishing a security enhanced connection), opening a locking mechanism (e.g., unlocking a safe), satisfying an access control mechanism, or a combination thereof.

The systems and methods described herein include technology that provides an enhanced cryptographic access control mechanism. In particular, aspects of the present disclosure may expand the access criteria that can be used to restrict or provide access to content. The cryptographic access control mechanism may control access based on a variety of factors, such as time, location, or other contextual data. The contextual data may be detected before, during, or after the device attempts to access the protected resource. The expanded access criteria may enable the technology to provide more precise access controls for defining situations in which the device is and is not restricted from accessing the protected resource. In addition, aspects of the present disclosure may enhance the security of the cryptographic access control mechanism by embedding the expanded access criteria into the cryptographic technique. By incorporating the expanded access criteria into key creation, the ability of compromised or malicious executable code to circumvent the access control mechanism is reduced.

Various aspects of the above referenced methods and systems are described in details herein below by way of examples, rather than by way of limitation. The examples provided below discuss an environment where a computing device is provided access to a protected resource based on the context of the computing device before, during, or after attempting to access the protected resource.

FIG. 1 illustrates an exemplary environment 100 in which implementations of the disclosure may operate. Environment 100 may include one or more computing devices at a single physical location or across multiple physical locations. In one example, environment 100 may include one or more protected resources 110A-D, one or more cryptographic keys 120A-B, and one or more computing devices 130A-D.

Protected resources 110A-D may be any intangible or tangible resource that a computing device or user can be restricted from accessing. An intangible resource may be a resource that cannot be touched by a human and may include data of messages (e.g., packets, data frames, analog or digital signals), data storage objects (e.g., computer files, database records, arrays), other digital or analog resources, or a combination thereof. Tangible resources may include resources that can be touched and may include computer hardware, physical credentials (e.g., ID badges, licenses), paper documents, currency, other physical objects, or a combination thereof.

Cryptographic keys 120A-B may be any piece of information that can be used to enable a computing device or user to access one or more of the protected resources 110A-D. Cryptographic keys 120A-B may exist in a human readable form (e.g., passcode, password), a non-human readable form (e.g., digital token or digital certificate), other form, or a combination thereof. Cryptographic keys 120A-B may be used as input to a cryptographic function or may be the output of a cryptographic function. Cryptographic keys 120A-B may be the same or similar to encryption keys, decryption keys, session keys, transport keys, authentication key, authorization key, digital certificates, signature keys, integrity keys, verification keys, digital tokens, tags, license keys, hashes, other data or data structure, or a combination thereof.

One or more of the cryptographic keys 120A-B may be used in a cryptographic system that provides privacy, integrity, authentication, authorization, non-repudiation, other features, or a combination thereof. The cryptographic system may be the same or similar to a symmetric key cryptographic system, an asymmetric key cryptographic system, or a combination thereof. A symmetric key cryptographic system may use the same cryptographic keys for encryption of plaintext and for decryption of ciphertext. The cryptographic keys may be referred to as symmetric keys and may be identical keys (e.g., copies of the same key) or there may be a simple transformation to go between two keys (e.g., between keys of a key pair). The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 1024). The symmetric key cryptographic system may be the same or similar to Advanced Encryption Standard (AES), Galois/Counter Mode (GCM), Data Encryption Standard (DES), Triple Data Encryption Standard (3DES, TDES), International Data Encryption Algorithm (IDEA), Blowfish, other cryptographic system, or a combination thereof.

An asymmetric key cryptographic system may use different keys for encryption and decryption. A first key may be used to encrypt plaintext into ciphertext and a second key may be used to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public key and the second key may be a private key. The public key may be published and accessible to multiple computing devices and the private key may remain secret and only accessible to one or more computing device associated with a particular entity (e.g., user). A public key cryptographic system may enable any device to encrypt data using the public key of a recipient device. The encrypted data may be decrypted with the recipient's private key. An advantage of asymmetric key cryptographic system is that it may avoid the need of a secure channel for an initial exchange of one or more cryptographic keys between the parties, which is often a challenge for symmetric cryptographic systems.

In one example, environment 100 may use a combination of an asymmetric cryptographic system and a symmetric cryptographic system. For example, one or more of the computing devices 130A-D may use an asymmetric cryptographic system to perform an exchange of security data 143 (e.g., security key), conversion data 141 (e.g., transformation parameters), or a combination there of. The exchanged data may then be used to create a cryptographic key (e.g., 120B) that enables one of the computing devices 130A-D to access or provide access to one of the protected resources 110A-D.

Computing devices 130A-D may include one or more mobile devices (e.g., smart phones, tablets, watches, key fobs, smart cards), personal computers (e.g., desktops, workstations, laptops), server devices (e.g., standalone servers or rack mounted servers), embedded systems (e.g., safes, door locks, automation devices), other electrical or electromechanical device, or a combination thereof. Computing devices 130A-D may be able to create, transmit, receive, or use one of the cryptographic keys 120A-B to protect or access resources. Each of the computing devices 130A-D may function as a requesting device, a protecting device, or a combination thereof. A requesting device may request access to a protected resource and a protecting device may provide restricted access to the protected resource.

Computing device 130A may be an example of a requesting device and may be used to access one or more of the protected resources 110A-D. Computing device 130A may be referred to as a "user device," "client device," "access requesting device," or other term. Computing device 130A may attempt to access a remote resource that is present on another computing device (e.g., protected resource 110C on computing device 130C) or a local resource that is stored in data store 140A of computing device 130A (e.g., protected resource 110A). Computing device 130A may include one or more sensors 131A-C to detect contextual data 142 of the computing device. Sensors 131A-C may include one or more location sensors 131A (e.g., Global Positioning Sensors (GPS)), wireless sensors 131B (e.g., WiFi, or Bluetooth Sensors), other sensors 131C (e.g., accelerometer, hydrometer, ambient light), or a combination thereof.

As shown in FIG. 1, computing device 130A may include a data transformation component 132, a cryptographic key creation component 134, and an access enablement component 136. Data transformation component 132 may enable computing device 130A to determine contextual data 142 (e.g., temporal data, location data, proximity data) derived from computing device 130A, environment 100, or a combination thereof. Data transformation component 132 may transform the contextual data 142 into one or more cryptographic values 144 in view of conversion data 141, other data, or a combination thereof. Cryptographic key creation component 134 may use the one or more cryptographic values 144, secret data 143, other data, or a combination thereof to create a cryptographic key 120A. Access enablement component 136 may use cryptographic key 120A to enable access to one of the protected resources 110A-D. Components 132, 134, and 136 are discussed in more detail below in regards to FIG. 2 and may be used to access protected resources provided by computing devices 130B-D (e.g., "access providing devices").

Computing device 130B may be a client device or server device with access to protected resource 110B. Computing device 130B may provide computing device 130A with access to protected resource 110B via a communication channel 152. Communication channel 152 may involve one or more connections 150 (e.g., e.g., connection 150A) that communicably couple computing devices 130A with one or more other devices (e.g., computing device 130B). Connection 150 may include one or more wired connections, wireless connections, or a combination thereof. Communication channel 152 may be associated with cryptographic key 120A and may use cryptographic key 120A to enhance one or more security features. The security features may enhance privacy, integrity, authentication, authorization, non-repudiation, other feature, or a combination thereof. In one example, communication channel 152 may be a security enhanced connection that occurs at any level of the networking stack and may be the same or similar to a connection based a Secure Socket Layer (SSL) connection, Transport Layer Security (TLS), Internet Protocol Security (IPSec), Virtual Private Network (VPN), Hyper Text Transfer Protocol Secure (HTTPS), other connection technology or protocol, or a combination thereof.

Communication channel 152 may be initiated or established by computing device 130A, computing device 130B, or a combination thereof. Cryptographic key 120A may be used to establish communication channel 152 or to enhance an existing communication channel. In one example, cryptographic key 120A may be session key that is used to decrypt and/or encrypt content of protected resource 110B. Protected resource 110B may include data this is stored in an encrypted or non-encrypted form when on computing device 130B and may be transmitted over communication channel 152 in an encrypted (e.g., or doubly encrypted) form. Computing device 130A may then receive the encrypted data and decrypt it using cryptographic key 120A.

Communication channel 152 may be a network connection, a computer-to-computer connection, other connection, or a combination thereof. The network connection may be an indirect connection that traverses one or more network nodes (e.g., access points, switches, routers, or other networking infrastructure device) that communicably couple computing device 130A with one or more of computing devices 130B-D. A computer-to-computer connection may be the same or similar to a peer-to-peer connection and may be a direct connection between computing device 130A and one of the computing device 130B-D (e.g., bluetooth connection, ad-hoc network connection).

Computing device 130C may include or be coupled to a data storage device that stores protected resource 110C. Protected resource 110C may include one or more encrypted data storage objects, which may include file objects (e.g., encrypted files), database objects (e.g., databases, records, field values), other storage objects, or a combination thereof. Computing device 130C may provide computing device 130A with access to protected resource 110C by transmitting data of protected resource 110C (e.g., encrypted content) over an encrypted or non-encrypted communication channel. Computing device 130A may receive the data and decrypt the data using cryptographic key 120A.

Cryptographic key 120A of the requesting device (e.g., 130A) and cryptographic key 120B of the providing device (e.g., 130C) may be identical but may have been independently created (e.g., separately derived). For example, computing device 130C may create a first cryptographic key (e.g., 120B) and may encrypt the protected resource 110C using the first cryptographic key. Computing device 130A may create a second cryptographic key and use the second cryptographic key to decrypt the protected resource 110C. The first and second cryptographic keys may be identical but may be created on different computing devices and may not have been exchanged between the different computing devices (e.g., not the result of a key exchange). The first and second cryptographic key may have been created at the same time or at different times. In one example, the first cryptographic key may be created and used to encrypt the protected resource at a first time (T1) and the second cryptographic key may be created and used to decrypt the protected resource at a second time (T2). The first time may be seconds, days, weeks, months, or years earlier than the second time (e.g., T1<<T2).

In the example shown if FIG. 1, computing device 130C may include the cryptographic key used to encrypt protected resource 110C (e.g., cryptographic key 120B). In another example (not shown), computing device 130C may be absent the cryptographic key used to encrypt protected resource 110B. In either example, computing device 130C may or may not have performed the encryption of protected resource 110C. For example, the encryption may have been performed by another device (e.g., server computing device 130B) and the other device may have stored the protected resource 110C on computing device 130C with or without storing the cryptographic key used to encrypt the protected resource 110C.

Computing device 130D may be an embedded control system that provides or restricts access to protected resource 110D. In one example, computing device 130D may be an embedded control system that provides physical access to an access restricted region (e.g., lockable region). The access may restrict the ability to enter, leave, add, or remove something or someone from the restricted region. The restricted region may be partially or fully enclosed and may include one or more points of access that may be restricted (e.g., restricted entry points). Example restricted regions may include computer enclosures (e.g., computer cases, rack units, server cabinets), boxes (e.g., safes, lock boxes), rooms (e.g., server rooms, file rooms), buildings (e.g., data centers), other regions, or a combination thereof. Protected resource 110D may be any tangible resource associated with computing device 130D and may include computer hardware (e.g., adapters, ports, connection points), physical credentials (e.g., ID badge, passport, license), paper documents, currency, other physical objects, or a combination thereof.

In one example, computing device 130D may be a lock box and protected resource 110D may be a tangible object in the lock box. The lock box (e.g., safe) may be accessible during particular dates and times (e.g., work days). A user may use computing device 130A (e.g., a mobile phone) to access the lock box based on contextual data associated with the phone at the time access is requested. The contextual data may correspond to the system time of computing device 130A when access is requested. Computing device 130A may use the contextual data to derive cryptographic key 120A and use the cryptographic key 120A to request access to the lock box. The embedded control system of the lock box may receive and verify cryptographic key 120A using a cryptographic function. In response to the verification being satisfied, the computing device 130B may unlock the restricted access point (e.g., lock box door) and a user of computing device 130A may retrieve the physical object.

Figure 2:
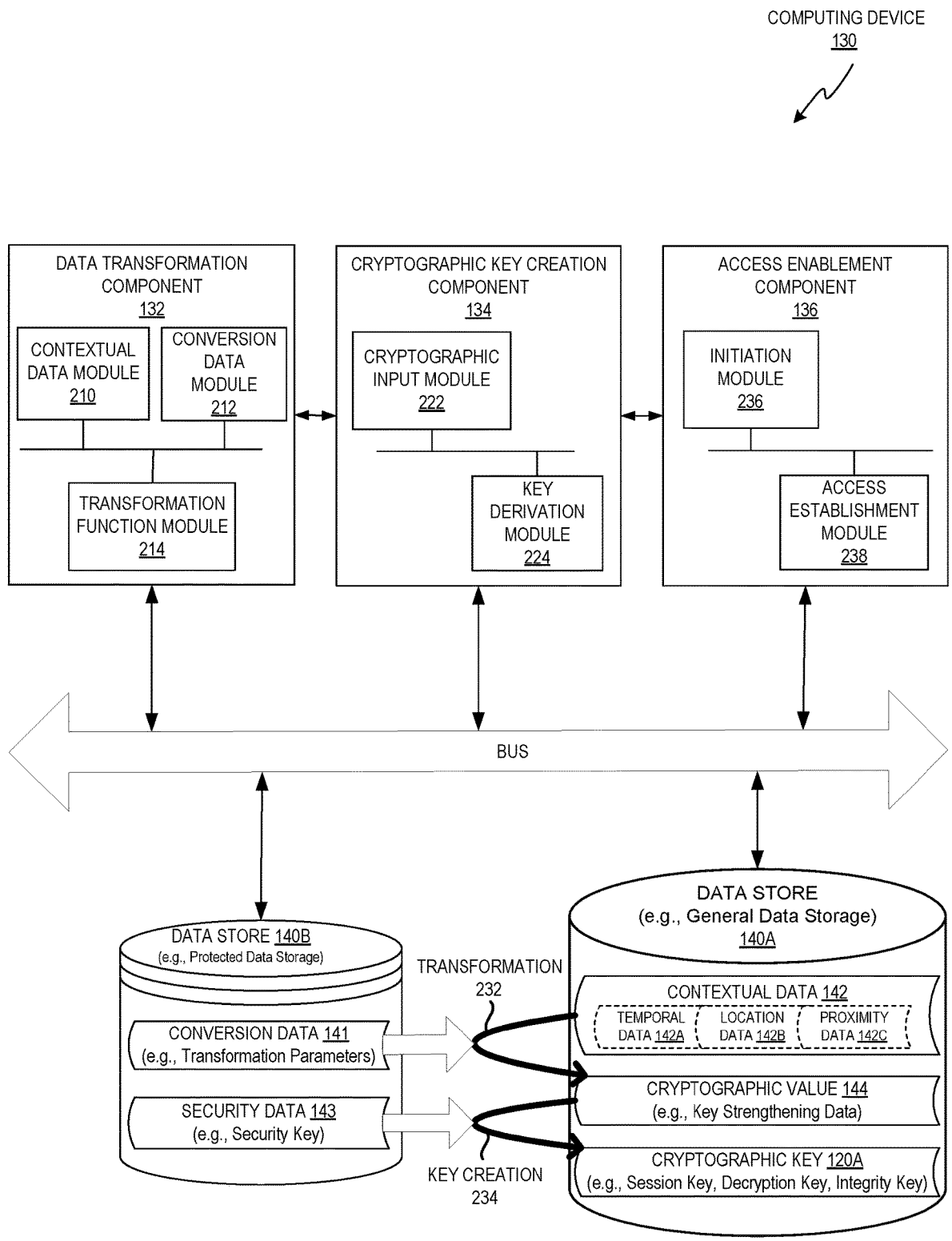
FIG. 2 depicts a block diagram of an example computing device with one or more components and modules, in accordance with one or more aspects of the present disclosure.

FIG. 2 is a block diagram illustrating example components and modules of computing device 130 in accordance with one or more aspects of the present disclosure. Computing device 130 may be the same or similar to one or more of computing devices 130A-D of FIG. 1. The components, modules, or features discussed in regards to computing device 130 may be consolidated to a single computing device or may be spread across multiple computing devices. In the example shown, computing device 130 may include a data transformation component 132, a cryptographic key creation component 134, an access enablement component 136, and one or more data stores 140A-B.

Data transformation component 132 may enable computing device 130 to identify contextual data (e.g., temporal data, proximity data, location data) and to transform the contextual data into a form that can be used to create a cryptographic key. In one example, data transformation component 132 may include a contextual data module 210, a conversion data module 212, and a transformation function module 214.

Contextual data module 210 may include features for determining a context of computing device 130 before, during, or after computing device 130 requests access to the protected resource. The context of computing device 130 may relate to one or more characteristics of the requesting device (e.g., computing device 130A), of the providing device (e.g., computing device 130B-D), of the environment 100, or a combination thereof. The characteristics (e.g., properties) of a device may relate to a location of the device, time of an access request, distance to another device, other characteristic, or a combination thereof. The characteristics of the device may be determined based on system settings, configurations, or operating details, and may include a time of the computing device (e.g., system time, network time). The characteristics of the environment may be characteristics that are external to a computing device and may include physical properties, attributes, or aspects of the environment surrounding computing device 130. Environment characteristics may include temperature, humidity, lighting, other physical property, or a combination thereof. The context of computing device 130 may be determined in view of one or more characteristics using contextual data module 210 and may be stored as contextual data 142.

Contextual data 142 may be any data that indicates a context of computing device 130 and may be stored in data store 140A. Contextual data 142 may represent the context of computing device 130 before, during, or after a request is initiated to access a protected resource. Computing device 130 may determine contextual data 142 by requesting, querying, calculating, executing, or reading data from a hardware device or sensor associated with computing device 130A. Contextual data 142 may correspond to one or more spatial or temporal dimensions and may include temporal data 142A, location data 142B, proximity data 142C, other data, or a combination thereof.

Temporal data 142A may indicate one or more times that are before, during, or after a request to access the protected resource is initiated. The times may be, current times (e.g., system times), past times (e.g., historical times), future times (e.g., extrapolated times), or a combination thereof. The times may include one or more time values that represent points in time (e.g., time stamp), time durations, other time measurement, or a combination thereof. The time values may include numeric data, alpha numeric data, character data, binary data, other data, or a combination thereof. Each of the one or more time values may correspond to a relative time, an absolute time, or a combination thereof. A relative time may be based on when the computing devices was manufactured, activated, turned on, restarted, logged on, connection established, or other reference time. An absolute time value may be an approximate duration of time (e.g., number of seconds) that has elapsed since a particular reference time (e.g., Jan. 1, 1970). The reference time may be a relative time that is specific to computing device 130 or may be a universal time (e.g., global time) that is used by a plurality of devices. For example, the universal time may be based on the Universal Reference Time (e.g., Coordinated Universal time (UTC)), Intentional Organization for Standardization (ISO) time (e.g., ISO 8601), other reference time, or a combination thereof. In one example, temporal data may include a time value that may be the same or similar to Unix Epoch time, Portable Operating System Interface (POSIX) time, or system time (e.g., OS or processor time).

Contextual data module 210 may determine temporal data 142A in view of a time of computing device 130. The time may be a system time that comprises a single number (e.g., signed integer) that may or may not be updated (e.g., incremented or replaced) at discrete intervals (e.g., every one or more seconds) by computing device 130A. Contextual data module 210 may determine temporal data 142A by accessing, retrieving, or requesting, the current time of computing device 130 (e.g., executing GetSystemTime function).

Location data 142B may include data that indicates a physical or virtual location of one or more of the requesting device (e.g., 130A of FIG. 1), the providing device (e.g., 130B-C), a communication device (e.g., beacon, access point, communication tower), other device, or a combination thereof. Location data 142B may indicate a current location, a past location (e.g., historical locations), a future location (e.g., extrapolated location), or a combination thereof. Location data 142B may include an absolute location relative to the earth and may be referred to as a geographic location. The absolute location may include geographic coordinates that represent a set of one or more geographic points or geographic regions. The geographic coordinates may include one or more numbers that uniquely identify a position of a point, area, volume, or other portion of space. In one example, location data 142B may include a coordinate with two values that identify a point in two-dimensional space, such as a latitude and longitude pair. In another example, location data 142B may include more or less values or may identify a point in three-dimensional space, such as a latitude and longitude pair coupled with a height value (e.g., altitude, elevation, depth, geopotential height).

Contextual data module 210 may determine location data 142B in view of satellites, cellular towers, network addresses, other device information, or a combination thereof. Location data 142B may correspond to a location within a reference system (e.g., coordinate system, geofence) that is the same or similar to a spherical system (e.g., geographic coordinate system), Euclidean system, or other reference system. In one example, location data 142B may be determined using a Global Positioning System (GPS).

Proximity data 142C may indicate whether computing device 130 is near one or more objects (e.g., devices or users). Proximity data 142C may be similar to location data 142B and both may indicate a physical location of computing device 130. As such, both proximity data 142C and location data 142B may be generally referred to as spatial data. In contrast, proximity data 142C may differ from location data 142B because proximity data 142C may indicate a physical location that is relative to another device (e.g., a relative location) without indicating an absolute location (e.g., geographical location). In one example, proximity data 142C may indicate a distance value (e.g., linear distance) between computing device 130 and one or more objects. In another example, proximity data 142C may indicate whether computing device 130 is within a linear distance threshold with or without providing a particular distance value. In either example, proximity data 142C may be determined using a proximity sensor associated with computing device 130.

The proximity sensor may enable computing device 130 to detect whether it is in the presence of a nearby object without requiring physical contact with the object. The proximity sensor may include one or more communication modules (e.g., Bluetooth® transceiver, Ethernet adapter) that can be used to detect signals from one or more devices or other pieces of hardware that transmit the signals. The signal may be a wireless signal, a wired signal, or a combination thereof. The signal source may include beacons (e.g., bluetooth beacons), network nodes (e.g., access points, switches, routers), other devices, or a combination thereof.

Contextual data module 210 may analyze signals to determine a physical location of itself relative to a signal source. The determination may be based on latency, signal strength, signal frequency, propagation delay, other attribute, or a combination thereof. Contextual data module 210 may analyze signals from a single source or from multiple sources. The analysis may involve determining a physical attribute of one or more signals. The signal may function as a beacon and may be based on one or more electromagnetic signals. The electromagnetic signals may include radio frequency (RF) signals, infrared signals, optical signals, other signals, or a combination thereof. The beacon may also or alternatively be based on electrical signals (e.g., wired connection), sonic signals (e.g., ultrasonic signals), or other signals. Computing device 130 may be capable of transmitting the signals, receiving the signals, or a combination thereof. In one example, the computing device 130 may include radio frequency transceivers that receive and transmit the signals using a WiFi® protocol, a Bluetooth® protocol, other standard or proprietary protocol, or a combination thereof.

In one example, contextual data module 210 may determine the physical location based on latency by identifying a roundtrip time for a signal (e.g., message). For example, contextual data module 210 may determine a time duration between when a signal is transmitted (e.g., message sent) to when a response is received (e.g., same or different message received). The time duration may or may not be adjusted based on a processing delay of the device to respond to the transmitted signal. The resulting time duration may represent the bidirectional latency and may be divided by two to identify a unidirectional latency. Either the bidirectional or unidirectional latency may be converted to a distance value based on frequency of the signal (e.g., 2.4 GHz) and/or speed of the signal (e.g., speed of 2.4 GHz signal through air). Any or all of the above values may be stored as proximity data 142C.

Conversion data module 212 may enable computing device 130 to access conversion data 141 for use in transforming the contextual data 142. Conversion data 141 may be associated with a particular device or protected resource and may be used as parameters to transform contextual data 142 into cryptographic values. Conversion data 141 may be stored in data store 140B (e.g., Protected Data Storage) that is communicably coupled to computing device 130 and may be internal or external to computing device 130. In the example shown in FIG. 2, data store 140B may be an internal data store that is integrated within computing device 130. In another example (not shown), data store 140B may be an external data store that is external to an enclosure of computing device and may include flash drives (e.g., USB key), external hard drive, network storage (e.g., Network Attached Storage (NAS), Storage Area Network (SAN), cloud storage), chip card (e.g., smart card), key fob, other data storage, or a combination thereof.

Data store 140B may be a security enhanced portion of another data storage device (e.g., data store 140A). Data store 140B may include secondary storage (e.g., hard drive, solid state drive), memory (e.g., volatile or non-volatile memory), registers (e.g., processor registers), other data storage, or a combination thereof. In one example, data store 140B may be internal data storage that includes a private region of storage that may be referred to as an enclave and may be protected using Software Guard Extensions (SGX) for Intel® processors. The private region may be a portion of data store 140A (e.g., main memory) and the processor (e.g., CPU) may protect the private region from being accessed by processes running at reduced privilege levels (e.g., application level, as opposed to kernel level).

Conversion data 141 may be used for transforming contextual data 142 and may originate from a trusted source that is associated with computing device 130. The trusted source may cause data store 140B to be modified to include conversion data 141 and this may occur before, during, or after the computing device 130 is provided to a user. In one example, the trusted source may be a device associated with an IT department of a business entity and may modify data store 140B to include the conversion data during an installation, configuration, deployment, update (e.g., reconfiguration), other provisioning phase, or a combination thereof. The modification may involve direct physical access to computing device 130 or may be modified without direct physical access (e.g., pushed or pulled over a network connection).

Conversion data 141 may be based on access criteria that indicate the circumstances in which computing device 130 should or should not have access to the protected resource. The access criteria may include a set of criteria that include or correspond to conditional statements indicating when a protected resource can be accessed. Each access criteria in the set may indicate a value or range of values that when satisfied enable or disable access. The values may correspond to one or more time ranges (e.g., time blocks or durations), location ranges (e.g., geographic areas), proximity ranges (e.g., distances), other range, or a combination thereof. For example, the access criteria may indicate the protected resource can be accessed during particular times (e.g., business hours or not on weekends), at particular locations (e.g., data center, home office, not at school), or within a particular proximity (e.g., within 20 feet of the device, not when others users or computing devices are around). Conversion data 141 may include one or more values of the access criteria or be derived from the access criteria. In one example, the conversion data 141 may include one or more values for a transformation function module 214 and may or may not be reverse engineered to determine the values of the access criteria.

The access criteria may be available to the trusted source without being available to the access requesting device (e.g., 130A of FIG. 1) or the access providing device (e.g., 130B-D of FIG. 1). Some access control systems may include the access criteria on the access requesting or access providing device so that executable code running on the respective device can evaluate the access criteria when providing access. The presence of the access criteria on one of these devices may adversely affect the security of the system. The security of the system may be more vulnerable because the executable code can be circumvented or the access criteria can be accessed, modified, or reverse engineered to determine or alter where and when the device can be accessed. By having the access requesting and access providing devices be absent (e.g., without, free of, or missing) the access criteria it may reduce the possibility that the access criteria are compromised, which may enhance the security of the access control mechanism.

Conversion data 141 may be selected by the trusted source to transform a set of alternate contextual data values (e.g., different times or locations) into a specific cryptographic value. The specific cryptographic value is the value that when provided as input to the cryptographic key function results in the creation of the correct key. If the cryptographic value is different the resulting cryptographic key will be incorrect. The set of alternate contextual data values may include values that comply with the access criteria, values that do not comply with access criteria, or a combination thereof. The trusted source may generate conversion data 141 that when input to the transformation function causes alternate contextual data values that comply with the access criteria to be transformed into the specific cryptographic value (e.g., correct value) and alternate contextual values that do not comply with the access criteria to be transformed into a different cryptographic value (e.g., incorrect value). In one example, there may only be a single correct cryptographic value (or small sub set of values) that qualify as the specific cryptographic value and there may be a plurality of incorrect cryptographic values.

Transformation function module 214 may enable computing device 130 to perform a transformation 232 of contextual data 142 to generate cryptographic value 144. Transformation 232 may involve executing one or more transformation functions that take contextual data 142 as input and provide cryptographic value 144 as output. The transformation function may involve one or more operations (e.g., commands, instructions) that may execute as part of an operating system (e.g., kernel module), an application (e.g., smart phone app), a hardware feature (Application Specific Integrated Circuit (ASIC), other execution location, or a combination thereof. The transformation function may include one or more parameters, variables, constants, coefficients, other expression, or a combination thereof. The operations may modify, add, remove, switch, replace, trim, concatenate, pad, or alter, one or more bits of contextual data 142. The transformation function may also or alternatively involve one or more mathematical functions and may include equations, formulas, theorems, expressions, statements, other mathematical representations, or a combination thereof. In one example, the transformation function may use a floor function, a ceiling function, other function or a combination hereof. The floor function may be a mathematical function that takes as input a real number x and outputs the greatest integer less than or equal to x. The ceiling function may take as input a real number x and output the least integer greater than or equal to x.

Transformation function module 214 may use the same transformation function for different types of contextual data (e.g., spatial data or temporal data) or may use different transformation functions for one or more (e.g., each) of the different types of contextual data. In one example, when transformation function module 214 transforms temporal data 142A, it may use a first transformation function that is based on the day of the week and a second transformation function that is be based on the time of the day. Both transformation functions may take the same temporal data as input (e.g., a universal time) or may take different inputs that are based on the temporal data 142A. When different inputs are used, a pre-processing step may be applied to temporal data 142A to determine a first input (e.g., day of the week) and a second input (e.g., time of day). Each respective transformation function may produce a cryptographic value that is provided as separate inputs or as a combined input to create the cryptographic key. In one example, the first transformation function may involve a work day function and may be mathematically represented as: cryptographic value #1=floor((day_of_week−offset)/window), wherein the "day_of_week"=(current_epoch_time/day) % 7; "day"=24*60*60 (0=Thursday, 1=Friday, 2=Saturday, 3=Sunday, Monday=4 etc); "window"=5 (e.g., work days of validity); "offset"=4 (start of work week). The second transformation function may involve a working hours function that may be mathematically represented as: cryptographic value #2=floor((current_epoch_time % day−offset)/window), wherein the "offset"=9*60*60 (e.g., 9 am); "window"=8*60*60 (e.g., 8 hour workday); "day"=24*60*60 (e.g., seconds in a day).

In another example, transformation function module 214 may execute one or more transformation functions using location data 142B. A first transformation function may be based on a latitude value and the second transformation function may be based on the longitude value. Both transformation functions may take the same location data as input (e.g., a geographic coordinates) or may take different inputs that are based on location data 142B. In the latter situation, a pre-processing step may be applied to location data 142A to determine a first input (e.g., latitude) and a second input (e.g., longitude). In either situation, the respective first and second transformation functions may produce separate cryptographic values that are provided as separate input or as combined input to create a cryptographic key. In one example, the first transformation function may be mathematically represented as: cryptographic value #1=floor((latitude−latitude_variation_degrees)/(2*latitude_variation_degrees)) and the second transformation function may be mathematically represented as: cryptographic value #2 floor((longitude−longitude_variation_degrees)/(2*longitude_variation_degrees)). The "latitude" and "longitude" may be based on location data 142B and the "latitude_variation_degrees" and the "longitude_variation_degrees" may represent variations in degrees and may be based on conversion data 141.

When the contextual data includes proximity data 142C, the transformation function may use a distance value as input, a latency value as input, or a combination thereof. In one example, the transformation function may involve using a distance value as input and may be mathematically represented as: cryptographic key=floor((distance value−offset)/window)), wherein the "offset" is the minimal allowed distance (e.g., minimum distance threshold) and the "window" is based on the minimal allowed distance and the maximum allowed distance (e.g., maximum distance threshold), which may or may not correspond to the distance range discussed above. In another example, the transformation function may involve use of a latency value as input and may be mathematically represented as cryptographic key=floor (current_latency/maximum_acceptable_latency). The "current_latency" may be based on proximity data 142B and the "maximum_acceptable_latency" may be based on conversion data 141.

Cryptographic value 144 may be the output of the transformation function and may include one or more bits. Cryptographic value 144 may be stored in data store 140A and data store 140A may include non-persistent storage, persistent storage, or a combination thereof. In one example, transforming the contextual data 142 may involve transforming temporal data into a specific cryptographic value (e.g., correct value) for temporal data corresponding to a time within a time range and transforming the temporal data into one of a plurality of other values (e.g., incorrect values) in response to the temporal data corresponding to a time outside the time range. The resulting cryptographic value 144 may be used as input to a cryptographic key creation component 134.

Cryptographic key creation component 134 may enable computing device 130 to create a cryptographic key that can be used for accessing the protected resource. Cryptographic key creation component 134 may use the transformed contextual data discussed above to create cryptographic key 120A. In one example, cryptographic key creation component 134 may include a cryptographic input module 222 and a key derivation module 224.

Cryptographic input module 222 may include features for retrieving input for a cryptographic function. The input may be retrieved from data store 140A (e.g., general data storage), data store 140B (e.g., enclave), other location, or a combination thereof. The input may be referred to as cryptographic input and may include security data 143, contextual data 142, cryptographic value 144, other data, or a combination thereof. Security data 143 may include a security key that is in a non-human readable form (e.g., cryptographic key, digital token or certificate), a human readable form (e.g., security passcode or password), other form, or a combination thereof. The security key may be a symmetric key or asymmetric key and may be public or kept secret. The security key may function as a base key and be used to derive one or more other keys (e.g., cryptographic key 120A). In one example, the security data 143 may be stored with conversion data 141 in data store 140B and may be retrieved before, during, or after the conversion data 141 is retrieved. In another example, security data 143 may be received from another device as part of an update or key exchange (e.g., Diffie-Hellman key exchange). In either example, the security data 143 may be used as input to create the key.

Some or all of the cryptographic input may be provided to the cryptographic function as separate parameters, combined parameters, or a combination thereof. Multiple types of contextual data (e.g., temporal data and spatial data) may be used to derive a cryptographic key. In one example, cryptographic input module 222 may combine the cryptographic value of a first contextual data (e.g., temporal data) with the cryptographic value of the second contextual data (e.g., spatial data) to produce a combined cryptographic value that is provided as input for key derivation module 224. In another example, cryptographic input module 222 may provide the cryptographic value of a first contextual data (e.g., temporal data) and the cryptographic value of the second contextual data (e.g., spatial data) to the key derivation module 224 separately and the output of key derivation module 224 may be combined.

Key derivation module 224 may access data of cryptographic input module 222 and use it to perform key creation 234. Key creation 234 may involve executing a cryptographic key function that may or may not incorporate a number generator (e.g., random or pseudo-random number generator). Key creation 234 may supplement the cryptographic input discussed above with seed data, salt data, other data, or a combination thereof. The cryptographic key function may be the same or similar to a key generator function (e.g., keygen), a key derivation function (KDF), a cryptographic hash function, other cryptographic function, or a combination thereof. The key generator function may create the cryptographic key based on the transformed contextual data (e.g., cryptographic value 144) but may not use the secret key (e.g., absent a base key). The key derivation function may be similar to a key generator function but may create a cryptographic key using a base key (e.g., secret key).

The key derivation function may derive the cryptographic key from the secret key using the transformed contextual data (e.g., cryptographic value 144). This may result in a cryptographic key that is related to the secret key (e.g., mathematically related keys). The key derivation function may involve key strengthening (e.g., key hardening), key stretching (e.g., key lengthening), other key modification, or a combination thereof. The key derivation function may or may not enhance the security of the key or adjust the length of the key to comply with a particular format (e.g., minimum key length).

In one example, cryptographic key function may be a Password-Based Key Derivation Function (e.g., PBKDF1, PBKEDF2). The password-based key derivation function may repeatedly apply a Hash-based Message Authentication Code (HMAC) one or more salt values to the cryptographic input (e.g., transformed contextual data) to produce a cryptographic key. In another example, the cryptographic key function may include a cryptographic hash function, other function, or a combination thereof. In any of the above examples, the resulting cryptographic key may be stored in data store 140A as cryptographic key 120A and available to access enablement component 136.

Access enablement component 136 may enable computing device 130 to use cryptographic key 120A to access a protected resource. As discussed above in regards to computing devices 130B-D, there may be many different ways cryptographic key 120A may be used to access the protected resource. In one example, cryptographic key 120A may be used to establish a communication channel with another device. In another example, cryptographic key 120A may be used to encrypt or decrypt a data storage object (e.g., file). In other examples, cryptographic key 120A may be used as a key to a locking mechanism or some combination thereof to provide physical or virtual access to the protected resource. As shown in FIG. 2, access enablement component 136 may include an initiation module 236 and an access establishment module 238.

Initiation module 236 may enable computing device 130 to process a request to access the protected resource. The request may be manually or automatically initiated based on user input, the context of computing device 130, or a combination thereof. In one example, the request may be manually initiated in response to user input and the context data may be accessed, generated, or retrieved in response to the user input. The user input may involve any input provided by a user that can be detected and interpreted by computing device 130. Example user input may include touch input (e.g., tapping, touch gestures), accelerometer input (e.g., movement gestures), image input (e.g., face scan), audio input (e.g., voice commands), keyboard input (e.g., hitting enter), mouse input (e.g., clicking connect button), other input, or a combination thereof.

The request may be initiated based on a change in the context of computing device 130. The change in context may be detected by analyzing the contextual data and detecting when a change satisfies one or more triggering criteria (e.g., triggering conditions, triggering data). In one example, the contextual data used to initiate the request may be different from the contextual data used to create the cryptographic key. For example, a first type of contextual data (e.g., location data) may be used to initiate the request but a second type of contextual data (e.g., temporal data) may be used to create the cryptographic key. In other examples, the contextual data used to initiate the request and create the key may be the same or overlap (e.g., both may use spatial data but key creation may also use temporal data). The triggering criteria may be the same or similar to the access criteria discussed above and if satisfied may initiate access establishment module 238.

Access establishment module 238 may enable computing device 130 to use cryptographic key 120A to enable access to the protected resource. Enabling access may involve providing cryptographic key 120 as input to a cryptographic function. The cryptographic function may be the same or similar to the cryptographic function discussed above and may include one or more authentication functions, encryption/decryption functions, authorization functions, verification functions, integrity functions, non-repudiation functions, hash functions, other functions, or a combination thereof.

The cryptographic function may be executed on computing device 130, on one or more other computing devices, or a combination thereof. In one example, access establishment module 238 may transmit cryptographic key 120A to another computing device and the other computing device may execute a cryptographic function using cryptographic key 120A. In another example, computing device 130 may execute the cryptographic function locally using the cryptographic key 120A. In either example, access establishment module 238 may perform or cause one or more operations to provide, establish, facilitate, allow, permit, arrange, or enable access to the protected resource. This may cause the protected resource to be available to computing device 130 or to a user of computing device 130. The operations may function to establish a communication channel, decrypt content, unlock an access control mechanism, or a combination thereof.

Establishing a communication channel may involve using cryptographic key 120A to communicate with another computing device. Establishing the communication channel may involve using the cryptographic key 120A to authenticate the computing device by authenticating or authorizing a user, process, device, interface, address, port, socket, other computing structure, or a combination thereof. Establishing the communication channel may also or alternatively involve using the cryptographic key to verify message content received over the communication channel (e.g., session key). Access establishment module 238 may also enable access by using the cryptographic key to decrypt content. The content may be message content received using the communication channel or may be a local or remote data storage object (e.g., file).

Access establishment module 238 may unlock an access control mechanism by providing or transmitting cryptographic key 120A to access control mechanism on computing device 130 or another computing device (e.g., embedded control system). The recipient device may execute a cryptographic function using the cryptographic key and grant access if the cryptographic key is correct. Granting access may unlock the access control mechanism to provide access to the protected resource.

Figure 3:
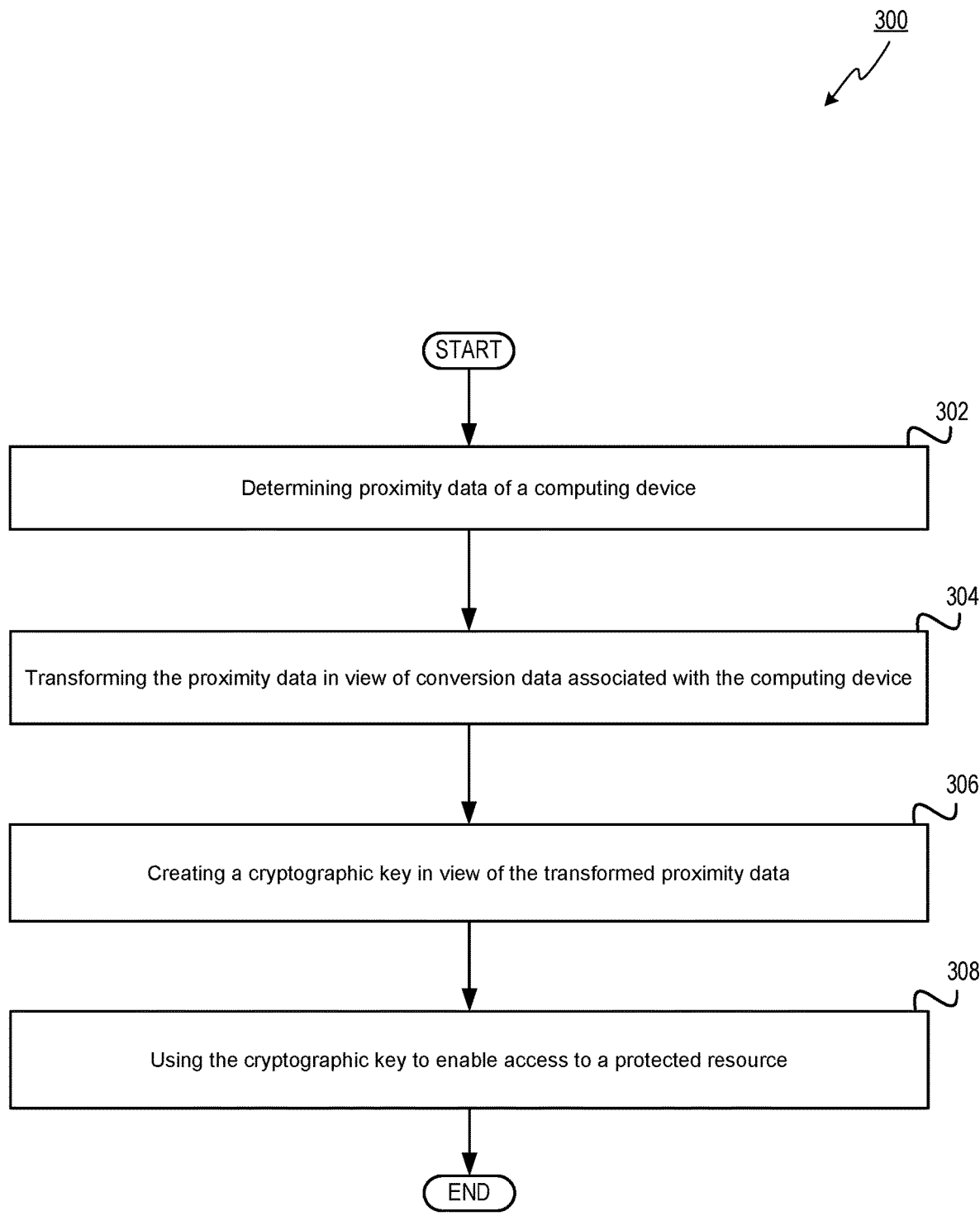
FIG. 3 depicts a flow diagram of an example method for enabling access to a protected resource using a cryptographic key created based on contextual data (e.g., temporal data, proximity data, and/or location data), in accordance with one or more aspects of the present disclosure.

FIG. 3 depicts a flow diagram of one illustrative example of a method 300 for enabling access to a protected resource using cryptographic key created based on contextual data, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 132, 134, and/or 136 of FIG. 2.

Method 300 may be performed by processing devices of a client device or server device and may begin at block 302. At block 302, a processing device may determine proximity data of a computing device. The determination of the proximity data may involve querying, acquiring, capturing, collecting, or requesting proximity data from a module of a computing device. In one example, the proximity data may correspond to a distance between the computing device and a beacon and determining the proximity data may involve calculating a distance in view of a message latency.

At block 304, the processing device may transform the proximity data in view of conversion data associated with the computing device. The conversion data may be stored in an enclave of the computing device and may include one or more values (e.g., numeric or binary values). The values may be provided as input to a transformation function and may cause a set of alternate proximity data values to transform to a specific cryptographic value. The set of alternate proximity data values may include a range of values in which the protected resource is accessible or is not accessibly by the computing device. The range of values may include one or more distance ranges (e.g., one or more distance thresholds). In one example, transforming the proximity data may involve transforming the proximity data into the specific cryptographic value (e.g., correct value) for proximity data corresponding to a distance within a distance range and transforming the proximity data into one of a plurality of other values (e.g., incorrect values) in response to the proximity data corresponding to a distance outside the distance range.

Transforming the proximity data of the computing device may involve determining the conversion data that is associated with the computing device and performing a mathematic transformation using the one or more values to produce the specific cryptographic value. The cryptographic value may include a plurality of bits and may be stored in a persistent or non-persistent data store. In one example, the mathematic transformation may include one or more mathematical equations and the conversion data may include input for the mathematical equation (e.g., values for constants, coefficients, variables, parameters).

At block 306, the processing device may create a cryptographic key in view of the transformed proximity data (e.g., cryptographic value). The cryptographic key may be used as a decryption key, an authentication key, an authorization key, a signature key, a transport key, an integrity key, a verification key, other use, or a combination thereof. Creating the cryptographic key may involve accessing security data associated with the computing device and executing a key derivation function using the security data, the transformed proximity data, or a combination thereof. In one example, the security data may include a security key and the security key and conversion data may be stored together in an enclave of the computing device.

At block 308, the processing device may use the cryptographic key to enable access to a protected resource. As discussed above, there may be many different ways to enable access to the protected resource. In one example, the cryptographic key may include a session key and the processing device may use the session key to establish a communication channel (e.g., SSL or IPSec connection) for accessing the protected resource. In another example, the cryptographic key may be a symmetric key for decrypting and/or encrypting data of the protected resource. The data may include encrypted message data, encrypted file data, encrypted database data, other data, or a combination thereof. The symmetric key used by the processing device may be created after the protected resource is encrypted and may be identical to the symmetric key used to encrypt the protected resource. For example, the symmetric key of the first computing device may be identical to a symmetric key of second device and may be obtained without performing a key exchange between the first computing device and the second computing device. Responsive to completing the operations described herein above with references to block 308, the method may terminate.

Figure 4:
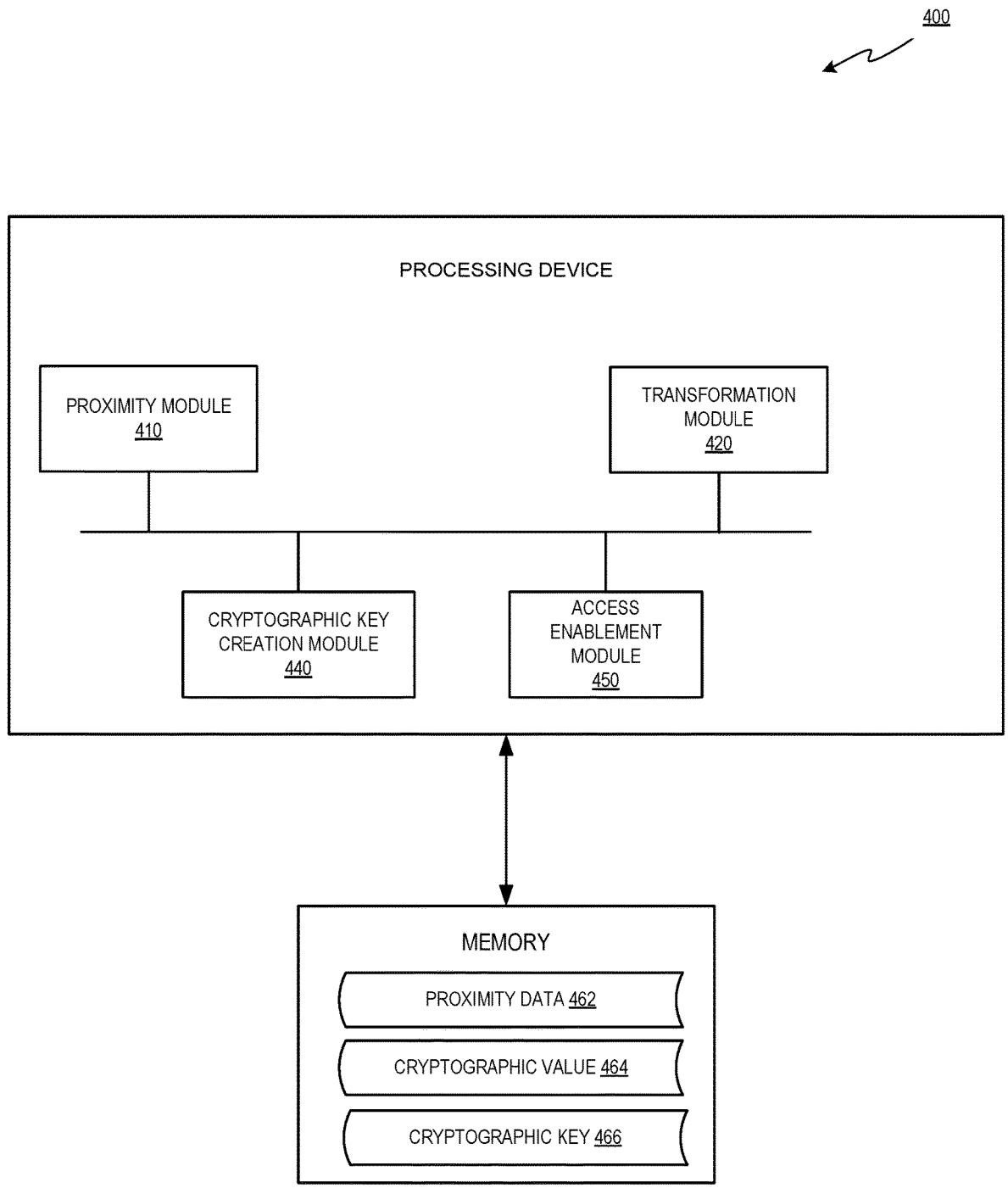
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing device 130 of FIG. 2 or computer system 500 of FIG. 5 and may include one or more processing devices and one or more memory devices. In the example shown, computer system 400 may include a proximity module 410, a transformation module 420, a cryptographic key creation module 430, and a access enablement module 440.

Proximity module 410 may enable a processing device to determine proximity data 462 of a computing device. The determination of proximity data 462 may involve querying, acquiring, capturing, collecting, or requesting proximity data from a module of a computing device. In one example, the proximity data 462 may correspond to a distance between the computing device and a beacon and determining the proximity data 462 may involve calculating a distance in view of a message latency.

Transformation module 420 may enable the processing device to transform the proximity data 462 in view of conversion data associated with the computing device. The conversion data may be stored in an enclave of the computing device and may include one or more values (e.g., numeric or binary values). The values may be provided as input to a transformation function and may cause a set of alternate proximity data values to transform to a specific cryptographic value 464. The set of alternate proximity data values may include a range of values in which the protected resource is accessible or is not accessibly by the computing device. The range of values may include one or more distance ranges (e.g., distance thresholds). In one example, transforming the proximity data 462 may involve transforming proximity data 462 into the specific cryptographic value 464 (e.g., correct value) for proximity data 462 corresponding to a distance within a distance range and transforming the proximity data 462 into one of a plurality of other values (e.g., incorrect values) in response to the proximity data 462 corresponding to a distance outside the distance range.

Transforming the proximity data 462 of the computing device may involve determining the conversion data that is associated with the computing device and performing a mathematic transformation using the one or more values to produce the specific cryptographic value 464. The cryptographic value 464 may include a plurality of bits and may be stored in a persistent or non-persistent data store. In one example, the mathematic transformation may include one or more mathematical equations and the conversion data may include input for the mathematical equation (e.g., values for constants, coefficients, variables, parameters).

Cryptographic key creation module 430 may enable the processing device to create a cryptographic key 466 in view of the transformed proximity data (e.g., cryptographic value 464). Cryptographic key 466 may be used as a decryption key, an authentication key, an authorization key, a signature key, a transport key, an integrity key, a verification key, other use, or a combination thereof. Creating cryptographic key 466 may involve accessing security data associated with the computing device and executing a key derivation function using the security data, the transformed proximity data, or a combination thereof. In one example, the security data may include a security key and the security key and conversion data may be stored together in an enclave of the computing device.

Access enablement module 440 may enable the processing device to use cryptographic key 466 to enable access to a protected resource. As discussed above, there may be many different ways to enable access to the protected resource. In one example, cryptographic key 466 may include a session key and the processing device may use the session key to establish a communication channel (e.g., SSL or IPSec connection) for accessing the protected resource. In another example, cryptographic key 466 may be a symmetric key for decrypting and/or encrypting data of the protected resource. The data may include encrypted message data, encrypted file data, encrypted database data, other data, or a combination thereof. The symmetric key used by the processing device may be created after the protected resource is encrypted and may be identical to the symmetric key used to encrypt the protected resource. For example, the symmetric key of the first computing device may be identical to a symmetric key of second device and may be obtained without performing a key exchange between the first computing device and the second computing device.

Figure 5:
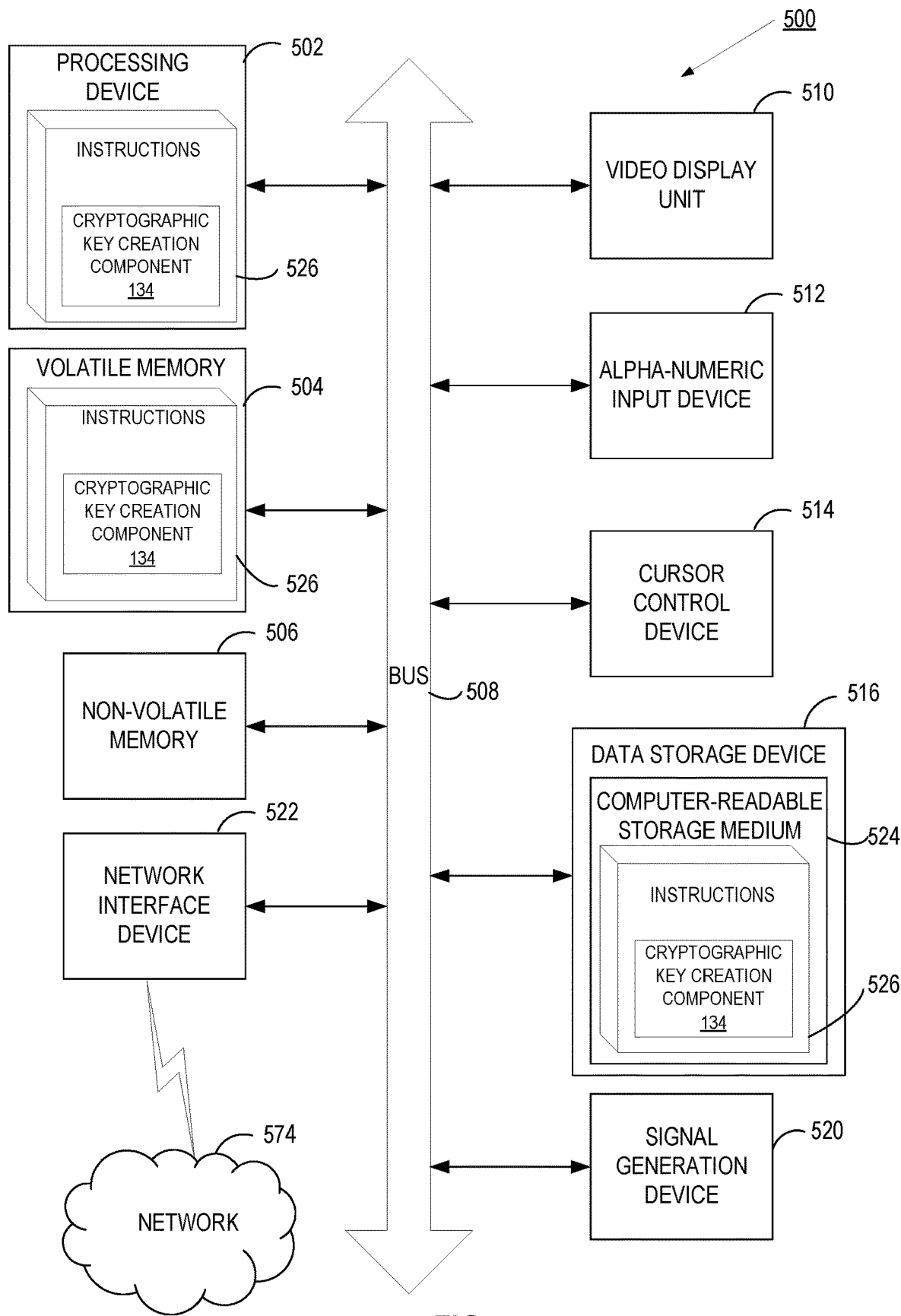
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to computing device 130A-D of FIG. 1 or computing device 130 of FIG. 2. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 300 and for encoding components 132, 134, and 136 of FIGS. 1-2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "transforming," "creating," "generating," "using," "accessing," "executing," "performing," "storing," "transmitting," "providing," "establishing," "receiving," "identifying," "obtaining," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    accessing, by a processing device, conversion data associated with a protected resource, wherein the conversion data comprises a transformation parameter and is generated based on access criteria indicating presence of a particular device to access the protected resource;
    determining, by the processing device, proximity data of a computing device, wherein the proximity data is based on a device near the computing device;
    transforming, by the processing device, the proximity data using the conversion data, wherein the conversion data causes the proximity data to transform to a specific cryptographic value;
    creating, by the processing device, a cryptographic key based on the specific cryptographic value; and
    using the cryptographic key to enable access to the protected resource.

2. The method of claim 1, wherein determining the proximity data comprises the processing device calculating a distance between the computing device and the device near the computing device, wherein the device comprises a communication module, a beacon, an access point, or a cellular tower.

3. The method of claim 1, wherein the transformation parameter causes a set of alternate proximity data values to transform into the specific cryptographic value, wherein the alternate proximity data values correspond to linear distances within a distance range that the protected resource can be accessed by the computing device.

4. The method of claim 3, wherein transforming the proximity data comprises transforming the proximity data into the specific cryptographic value in response to the proximity data corresponding to a distance within the distance range.

5. The method of claim 1, wherein the conversion data is selected to cause proximity data corresponding to a distance within a distance range to be transformed into the specific cryptographic value and proximity data corresponding to a distance outside the distance range to be transformed into another cryptographic value.

6. The method of claim 1, wherein the cryptographic key comprises a session key and wherein using the cryptographic key to enable access comprises using the session key to establish a communication channel for accessing the protected resource.

7. The method of claim 1, wherein the cryptographic key is created on a first computing device and is identical to a cryptographic key created on a second device, and wherein the creating the cryptographic key on the first computing device is performed without a key exchange between the first computing device and the second computing device.

8. The method of claim 1, wherein the cryptographic key comprises a symmetric key and wherein using the cryptographic key to access the protected resource comprises using the symmetric key to decrypt data of the protected resource.

9. The method of claim 8, wherein the symmetric key is created after the protected resource is encrypted, and wherein the symmetric key is identical to a symmetric key used to encrypt the protected resource.

10. The method of claim 1, wherein creating the cryptographic key comprises:
    accessing security data associated with the computing device; and
    executing a key derivation function using the security data and the transformed proximity data.

11. The method of claim 10, wherein the security data comprises a security key and wherein the security key and the conversion data are stored in an enclave of the computing device.

12. The method of claim 1, wherein transforming the proximity data comprises:
    performing a mathematic transformation on the proximity data using the transformation parameter of the conversion data to produce the specific cryptographic value; and
    storing the specific cryptographic value in a data store, wherein the specific cryptographic value comprises a plurality of bits.

13. The method of claim 12, wherein the mathematic transformation comprises a mathematical equation and the conversion data comprises input for the mathematical equation.

14. A system comprising:
    a memory;
    a processing device operatively coupled to the memory, the processing device to:
        access conversion data associated with a protected resource, wherein the conversion data comprises a transformation parameter and is generated based on access criteria indicating presence of a particular device to access the protected resource;
        determine proximity data of a computing device, wherein the proximity data is based on a device near the computing device;
        transform the proximity data using the conversion data, wherein the conversion data causes the proximity data to transform to a specific cryptographic value;
        create a cryptographic key based on the specific cryptographic value; and
        use the cryptographic key to enable access to the protected resource.

15. The system of claim 14, wherein to determine the proximity data the processing device is to calculate a distance between the computing device and the device near the computing device, wherein the device comprises a communication module, a beacon, an access point, or a cellular tower.

16. The system of claim 14, wherein the transformation parameter causes a set of alternate proximity data values to transform into the specific cryptographic values, wherein the alternate proximity data values correspond to linear distances within a distance range that the protected resource can be accessed by the computing device.

17. The system of claim 16, wherein to transform the proximity data the processing device is to transform the proximity data into the specific cryptographic value in response to the proximity data corresponding to a linear distance within the distance range.

18. A non-transitory computer readable medium comprising instructions that cause a processing device to:
  access security data associated with a computing device and conversion data associated with a protected resource, wherein the conversion data comprises a transformation parameter and is generated based on access criteria indicating presence of a particular device to access the protected resource;
  determine proximity data of the computing device, wherein the proximity data is based on a device near the computing device;
  transform the proximity data using the conversion data, wherein the conversion data causes the proximity data to transform to a specific cryptographic value;
  execute a key derivation function using the security data and the specific cryptographic value to create a cryptographic key; and
  use the cryptographic key to enable access to the protected resource.

19. The non-transitory machine-readable storage medium of claim 18, wherein the conversion data is selected to cause proximity data corresponding to a distance within a distance range to be transformed into the specific cryptographic value and proximity data corresponding to a distance outside the distance range to be transformed into another cryptographic value.

20. The non-transitory machine-readable storage medium of claim 18, wherein the security data comprises a security key and wherein the security key and the conversion data are stored in an enclave of the computing device.

* * * * *